US010167659B2

(12) United States Patent
Sagisaka et al.

(10) Patent No.: US 10,167,659 B2
(45) Date of Patent: Jan. 1, 2019

(54) STRUCTURE CONFIGURED TO RAISE AND LOWER VEHICLE GLASS DOOR

(71) Applicant: TOYOTA JIDOSHA KABUSHIKI KAISHA, Toyota-shi (JP)

(72) Inventors: Takashi Sagisaka, Miyoshi (JP); Tomohiro Dosaki, Kiyosu (JP); Yoshinobu Yamada, Kiyosu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 131 days.

(21) Appl. No.: 15/287,216

(22) Filed: Oct. 6, 2016

(65) Prior Publication Data

US 2017/0145723 A1 May 25, 2017

(30) Foreign Application Priority Data

Nov. 24, 2015 (JP) ................................. 2015-228955

(51) Int. Cl.
  *B60J 5/04* (2006.01)
  *E05D 15/16* (2006.01)
  *B60J 1/17* (2006.01)

(52) U.S. Cl.
  CPC .............. *E05D 15/165* (2013.01); *B60J 1/17* (2013.01); *E05Y 2201/684* (2013.01); *E05Y 2900/55* (2013.01)

(58) Field of Classification Search
  CPC ...... E05D 15/165; B60J 1/17; E05Y 2900/55; E05Y 2201/684

(Continued)

(56) References Cited

U.S. PATENT DOCUMENTS 4,240,227 A * 12/1980 Hasler ..................... B60J 10/79
  49/348
4,417,419 A * 11/1983 Rossie ................... B60J 10/248
  49/348

(Continued)

FOREIGN PATENT DOCUMENTS

JP  60-115367 U  8/1985
JP  60-164426 U  10/1985

(Continued)

*Primary Examiner* — Jerry E Redman
(74) *Attorney, Agent, or Firm* — Oblon, McClelland, Maier & Neustadt, L.L.P.

(57) ABSTRACT

A structure configured to raise and lower vehicle glass door, the structure includes: a door glass; a raising-and-lowering guide tab that is disposed at a vehicle width direction inner side of a glass end section at one vehicle front-rear direction side of the door glass; a slider that includes a slide groove section open at the one vehicle front-rear direction side and into which the raising-and-lowering guide tab is inserted, that is fixed to an inner surface at the vehicle width direction inner side of the glass end section, and that is raised and lowered along the raising-and-lowering guide tab; and restricting sections that are respectively provided at an upper end portion and a lower end portion in a vehicle up-down direction of the slider, that project out from an inner side groove wall face at a vehicle width direction inner side of the slide groove section toward a vehicle width direction outer side, and that face the raising-and-lowering guide tab in a vehicle width direction further toward a vehicle width direction outer side than the inner side groove wall face at an intermediate portion in the vehicle up-down direction of the slider.

11 Claims, 5 Drawing Sheets

(58) Field of Classification Search
USPC .................................................. 49/501, 502
See application file for complete search history.

(56) References Cited

U.S. PATENT DOCUMENTS

| | | | | |
|---|---|---|---|---|
| 4,418,498 A * | 12/1983 | Wanlass | ................ | E05F 11/382 49/348 |
| 4,483,100 A * | 11/1984 | Blankenburg | ........ | E05F 11/426 49/352 |
| 4,490,942 A * | 1/1985 | Arnheim | .................. | B60J 10/24 49/374 |
| 4,494,337 A * | 1/1985 | Watanabe | ................ | B60J 10/79 49/374 |
| 4,503,639 A * | 3/1985 | Rossie | .................... | B60J 10/79 49/227 |
| 4,567,691 A * | 2/1986 | Warner | .................... | B60J 10/79 49/374 |
| 4,571,886 A * | 2/1986 | Shiraishi | .................. | B60J 10/79 49/374 |
| 4,581,851 A * | 4/1986 | Warner | .................. | B60J 10/248 428/122 |
| 4,604,830 A * | 8/1986 | Maeda | ................... | B60J 10/248 49/374 |
| 4,608,779 A * | 9/1986 | Maeda | ................... | B60J 10/248 428/122 |
| 4,616,446 A * | 10/1986 | Okamoto | ................. | B60J 10/22 428/122 |
| 4,621,453 A * | 11/1986 | Watanabe | ................ | B60J 10/79 49/227 |
| 4,628,637 A * | 12/1986 | Okada | .................... | B60J 10/79 49/374 |
| 4,631,865 A * | 12/1986 | Motonanni | .............. | B60J 10/79 49/374 |
| 4,653,230 A * | 3/1987 | Seo | .......................... | B60J 10/79 49/227 |
| 4,653,802 A * | 3/1987 | Watanabe | ............... | B62D 25/06 296/146.2 |
| 4,662,113 A * | 5/1987 | Weaver | ............. | B29C 45/14377 49/404 |
| 4,697,386 A * | 10/1987 | Watanabe | ................ | B60J 10/79 49/374 |
| 4,823,511 A * | 4/1989 | Herliczek | ................ | B60J 10/74 428/83 |
| 4,874,201 A * | 10/1989 | Scaglietti | ................. | B60J 10/24 296/146.9 |
| 4,875,307 A * | 10/1989 | Barbero | ................... | B60J 10/24 49/374 |
| 4,903,436 A * | 2/1990 | Rouillard | ................ | B60J 10/79 49/440 |
| 4,932,161 A * | 6/1990 | Keys | ....................... | B60J 10/24 49/374 |
| 4,969,293 A * | 11/1990 | Guillon | .................... | B60J 10/16 49/374 |
| 4,970,828 A * | 11/1990 | Mesnel | ................... | B60J 10/79 49/374 |
| 5,013,379 A * | 5/1991 | Brooks | ................... | B32B 25/08 156/244.11 |
| 5,086,589 A * | 2/1992 | dibenedetto | ........... | B60J 5/0402 296/146.3 |
| 5,159,781 A * | 11/1992 | Glossop, Jr. | ............... | B60J 1/17 49/375 |
| 5,613,325 A * | 3/1997 | Mariel | ............. | B32B 17/10036 49/374 |
| 5,732,509 A * | 3/1998 | Buehler | ................... | B60J 10/79 49/440 |
| 6,141,910 A * | 11/2000 | Kobrehel | ................ | B60J 5/0402 49/348 |
| 6,364,397 B1 * | 4/2002 | Bordeaux | ................. | B60J 1/08 296/146.2 |
| 6,572,176 B2 * | 6/2003 | Davis | ....................... | B60J 10/78 296/146.16 |
| 6,880,293 B2 * | 4/2005 | Ishikawa | ................... | B60J 1/17 49/414 |
| 6,976,727 B2 * | 12/2005 | Omori | ....................... | B60J 1/16 296/146.16 |
| 7,624,537 B2 * | 12/2009 | Moreau | .................... | B60J 1/17 49/212 |
| 8,434,267 B2 * | 5/2013 | Bocutto | ................ | B60J 10/235 296/93 |
| 8,561,354 B2 * | 10/2013 | Grudzinski | ........... | E05F 11/382 49/441 |
| 8,572,898 B2 * | 11/2013 | Grudzinski | ............ | B60J 5/0402 49/441 |
| 8,646,215 B2 * | 2/2014 | Grudzinski | ................ | B60J 1/17 49/441 |
| 8,650,802 B2 * | 2/2014 | Grudzinski | ............ | B60J 5/0402 49/441 |
| 9,067,353 B2 * | 6/2015 | Coldre | ................ | B29C 45/1676 |
| 9,925,850 B2 * | 3/2018 | Yoshida | ................. | B60J 5/0402 |
| 2006/0021282 A1 * | 2/2006 | Tamaoki | .................. | B60J 10/74 49/441 |
| 2008/0224501 A1 * | 9/2008 | Zimmer | ..................... | B60J 1/08 296/201 |
| 2009/0001755 A1 * | 1/2009 | Fuetterer | ................ | B60J 5/0409 296/146.16 |
| 2009/0309391 A1 * | 12/2009 | Krause | .................... | B60J 10/79 296/201 |

FOREIGN PATENT DOCUMENTS

| | | |
|---|---|---|
| JP | 2004-196073 | 7/2004 |
| JP | 2005-255108 | 9/2005 |
| JP | 2006-341693 A | 12/2006 |
| JP | 4177279 | 11/2008 |

* cited by examiner

STRUCTURE CONFIGURED TO RAISE AND LOWER VEHICLE GLASS DOOR

CROSS-REFERENCE TO RELATED APPLICATION

This application is based on and claims priority under 35 USC 119 from Japanese Patent Application No. 2015-228955 filed on Nov. 24, 2015, the disclosure of which is incorporated by reference herein.

BACKGROUND

Technical Field

The present disclosure relates to a structure configured to raise and lower vehicle glass door.

Related Art

Vehicle side doors exist which include door glass that opens and closes a window opening inside a window frame section of the vehicle side door, a glass run (channel) that is provided along a vertical frame section of the window frame section, and a slider that is provided at an end portion of the door glass and is raised and lowered along the glass run (see, for example, Japanese Patent Application Laid-Open (JP-A) No. 2004-196073). In the technology described in JP-A No. 2004-196073, the slider is gripped from both vehicle width direction sides by an outside lip and an inside lip of the glass run.

Note that, besides JP-A No. 2004-196073, for example, JP-A No. 2005-255108 also exists as technology relating to a vehicle side door.

However, in the technology described in JP-A No. 2004-196073, when the door glass is displaced toward the vehicle width direction outer side with respect to the window frame section, the outside lip undergoes elastic deformation toward the vehicle width direction outer side. There is accordingly a possibility of a large amount of displacement of the door glass toward the vehicle width direction outer side with respect to the window frame section.

As a countermeasure thereto, it would be conceivable, for example, to provide a restricting wall running in the vehicle up-down direction along the vertical frame section at the vehicle width direction outer side of the slider, and to restrict displacement of the slider toward the vehicle width direction outer side using the restricting wall.

However, in such cases, friction force (slide resistance) occurring between the restricting wall and the slider would increase when the slider was raised or lowered along the vertical frame section, and there would be a possibility of a fault occurring in the raising and lowering of the door glass.

SUMMARY

Thus, an object of the present disclosure is to provide a structure configured to raise and lower vehicle glass door capable of suppressing or eliminating faulty raising and lowering of a door glass, while restricting displacement of the door glass toward the vehicle width direction outer side.

A structure configured to raise and lower vehicle glass door according to a first aspect, the structure includes: a door glass that is provided at a vehicle side door and that closes or opens a window opening of the vehicle side door as a result of being raised or lowered; a raising-and-lowering guide tab that is provided at the vehicle side door, that is disposed at a vehicle width direction inner side of a glass end section at one vehicle front-rear direction side of the door glass, and that extends along a vehicle up-down direction; a slider that includes a slide groove section open at the one vehicle front-rear direction side and into which the raising-and-lowering guide tab is inserted, that is fixed to an inner surface at the vehicle width direction inner side of the glass end section, and that is raised and lowered along the raising-and-lowering guide tab; and restricting sections that are respectively provided at an upper end portion and a lower end portion in a vehicle up-down direction of the slider, that project out from an inner side groove wall face at a vehicle width direction inner side of the slide groove section toward a vehicle width direction outer side, and that face the raising-and-lowering guide tab in a vehicle width direction further toward a vehicle width direction outer side than the inner side groove wall face at an intermediate portion in the vehicle up-down direction of the slider.

In the above structure configured to raise and lower vehicle glass door, the slider is fixed to the inner surface at the vehicle width direction inner side of the glass end section at the one vehicle front-rear direction side of the door glass. The slider includes the slide groove section that is open at the one vehicle front-rear direction side. The raising-and-lowering guide tab is inserted into the slide groove section. The raising and lowering of the door glass is guided by the raising-and-lowering guide tab due to the slider being raised and lowered along the raising-and-lowering guide tab.

The restricting sections are respectively provided at the upper end portion and the lower end portion in the vehicle up-down direction of the slider. The respective restricting sections project out from the inner side groove wall face at the vehicle width direction inner side of the slide groove section toward the vehicle width direction outer side. The respective restricting sections face the raising-and-lowering guide tab in the vehicle width direction further toward the vehicle width direction outer side than the inner side groove wall face at the intermediate portion in the vehicle up-down direction of the slider. Thus, the respective restricting section is press-contacted by the raising-and-lowering guide tab when the slider is displaced toward the vehicle width direction outer side. Displacement of the slider and the door glass toward the vehicle width direction outer side is restricted as a result.

The restricting sections face the raising-and-lowering guide tab in the vehicle width direction further toward the vehicle width direction outer side than the inner side groove wall face at the intermediate portion in the vehicle up-down direction of the slider. Press-contact of the inner side groove wall face by the raising-and-lowering guide tab at the intermediate portion in the vehicle up-down direction of the slider is thereby suppressed. This suppresses the occurrence of friction force (slide resistance) between the inner side groove wall face and the raising-and-lowering guide tab when the slider been raised or lowered along the raising-and-lowering guide tab. This suppresses faulty raising and lowering of the door glass, or eliminates this faulty raising and lowering.

In this manner, the present aspect enables faulty raising and lowering of the door glass to be suppressed or eliminated, while restricting displacement of the door glass toward the vehicle width direction outer side.

A structure configured to raise and lower vehicle glass door according to a second aspect is the structure configured to raise and lower vehicle glass door according to the first aspect, the raising-and-lowering guide tab is provided with a slider weather strip that extends in the vehicle up-down direction along the raising-and-lowering guide tab and that closes gaps between the raising-and-lowering guide tab, and the inner side groove wall face and the restricting sections.

In the above structure configured to raise and lower vehicle glass door, the slider weather strip is provided along the raising-and-lowering guide tab. The respective gaps between the raising-and-lowering guide tab, and the inner side groove wall face and the restricting sections are closed by the slider weather strip. Thus, rainwater or the like is suppressed from entering a vehicle cabin through gaps between the raising-and-lowering guide tab and the inner side groove wall face and the restricting sections.

When the slider is displaced toward the vehicle width direction outer side, the restricting sections provided at the upper end portion and the lower end portion of the slide are press-contacted by the raising-and-lowering guide tab with the slider weather strip interposed therebetween. Displacement of the door glass toward the vehicle width direction outer side is thereby restricted.

As previously described, the restricting sections are not provided at the intermediate portion in the up-down direction of the slider. Press-contact of the inner side groove wall face by the raising-and-lowering guide tab with the slider weather strip interposed therebetween is thereby suppressed at the intermediate portion in the vehicle up-down direction of the slider. This reduces the occurrence of friction force (slide resistance) between the inner side groove wall face and the slider weather strip when the slider has been raised or lowered along the raising-and-lowering guide tab. This suppresses or eliminates faulty raising and lowering of the door glass.

A structure configured to raise and lower vehicle glass door according to a third aspect is the structure configured to raise and lower vehicle glass door according to the second aspect, wherein, as viewed from the one vehicle front-rear direction side of the restricting sections, each of the restricting sections includes: a facing face that faces the raising-and-lowering guide tab in the vehicle width direction and that contacts the slider weather strip; and a sloped face that slopes toward the vehicle width direction inner side on progression from the facing face toward a center side in the vehicle up-down direction of the slider and that connects the facing face with the inner side groove wall face.

In the structure configured to raise and lower vehicle glass door, each of the restricting sections includes a facing face and a sloped face. As viewed from the one vehicle front-rear direction side of the restricting sections, the sloped faces slope toward the vehicle width direction inner side on progression from the facing face toward the center side in the vehicle up-down direction of the slider, and connects the facing face with the inner side groove wall face.

Note that, when the slider is raised or lowered along the raising-and-lowering guide tab, the slider weather strip moves between the facing face of the respective restricting section and the inner side groove wall face. If there is a step between the facing face of the restricting section and the inner side groove wall face, there is possibility that the slider weather strip is damaged when this occurs.

To address this, in the present aspect, as described above, the facing face of the restricting sections and the inner side groove wall face are connected by the sloped faces. Thus, the slider weather strip moves along the sloped face between the facing face of the respective restricting section and the inner side groove wall face. Damage to the slider weather strip is thereby suppressed.

A structure configured to raise and lower vehicle glass door according to a fourth aspect is the structure configured to raise and lower vehicle glass door according to the second aspect or the third aspect, wherein: the vehicle side door is provided with an outside biasing lip that presses and biases the inner surface of the door glass toward the vehicle width direction outer side, that causes the restricting sections to press-contact an inner surface at a vehicle width direction inner side of the raising-and-lowering guide tab with the slider weather strip interposed therebetween, and that forms a gap between an outer surface at a vehicle width direction outer side of the raising-and-lowering guide tab, or between a covering member that covers the outer surface and an outer side groove wall face at a vehicle width direction outer side of the slide groove section.

In the above structure configured to raise and lower vehicle glass door, the vehicle side door includes the outside biasing lip that presses and biases the inner surface of the door glass toward the vehicle width direction outer side. The restricting sections are press-contacted by the inner surface at the vehicle width direction inner side of the raising-and-lowering guide tab with the slider weather strip interposed therebetween due to the outside biasing lip. Vibration of the slider in the vehicle width direction is thereby reduced.

A gap is formed between the outer surface at the vehicle width direction outer side of the raising-and-lowering guide tab, or between the covering member that covers the outer surface, and the outer side groove wall face at the vehicle width direction outer side of the slide groove section, due to the outside biasing lip. This suppresses the occurrence of friction force (slide resistance) between the outer surface of the raising-and-lowering guide tab, or between the covering member and the outer side groove wall face when the slider has been raised or lowered along the raising-and-lowering guide tab. This further suppresses or eliminates faulty raising and lowering of the door glass.

As explained above, the structure configured to raise and lower vehicle glass door according to the present disclosure is capable of suppressing or eliminating faulty raising and lowering of the door glass, while restricting displacement of the door glass toward the vehicle width direction outer side.

BRIEF DESCRIPTION OF THE DRAWINGS

Exemplary embodiments of the present disclosure will be described in detail based on the following figures, wherein.

DETAILED DESCRIPTION

Explanation follows regarding a vehicle side door structure according to an exemplary embodiment, with reference to the drawings. Note that in each of the drawings as appropriate, the arrow FR indicates the vehicle front side (vehicle front-rear direction front side). The arrow UP indicates the vehicle upper side (vehicle up-down direction upper side). The arrow OUT indicates the vehicle width direction outer side (vehicle cabin outer side). In the below explanation, unless specifically stated otherwise, the front and rear, up and down, and left and right respectively refer to front and rear in the vehicle front-rear direction, up and down in the vehicle up-down direction, and left and right in the vehicle width direction.

Figure 1:
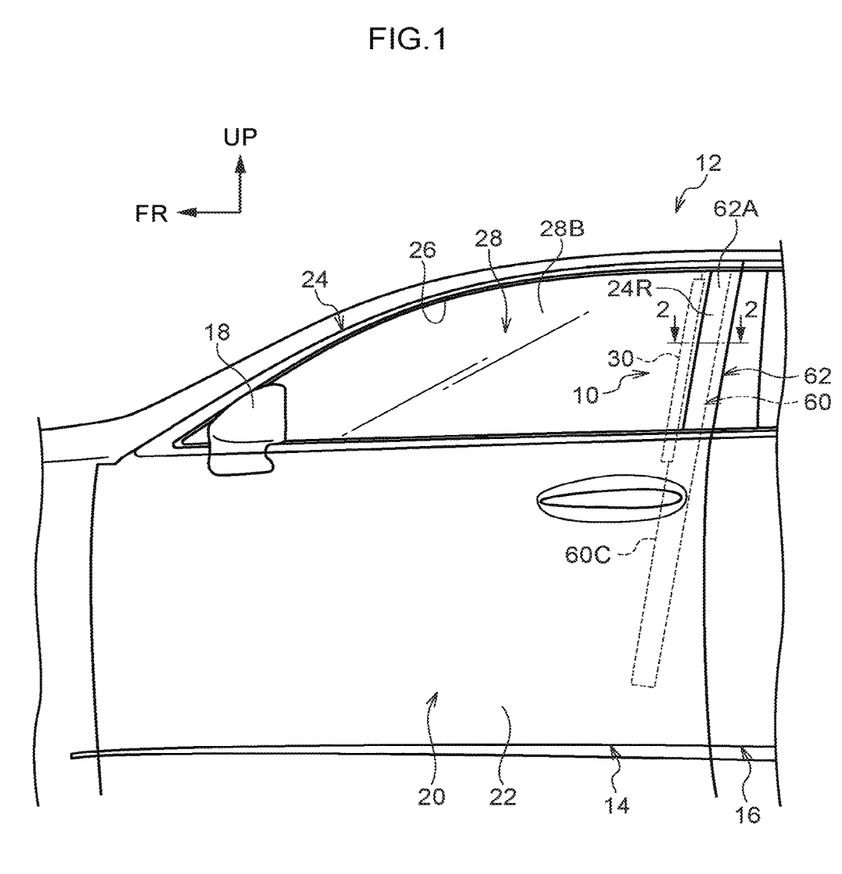
FIG. 1 is a side view of a vehicle side door applied with a structure configured to raise and lower vehicle glass door according to an exemplary embodiment, as viewed from the vehicle width direction outer side.

FIG. 1 illustrates a vehicle side door 14 applied with a structure 10 configured to raise and lower vehicle glass door according to the present exemplary embodiment. The vehicle side door 14 is a vehicle front side door that opens and closes a door opening (raising-and-lowering port) formed in a side section of a vehicle front section of a vehicle 12. A vehicle rear side door 16 is disposed at the rear side of the vehicle side door 14.

The vehicle side door 14 includes a side door main body 20, a window frame section 24, and door glass (door window glass) 28. The side door main body 20 is disposed along the vehicle front-rear direction and the vehicle up-down direction. The side door main body 20 configures a lower section of the vehicle side door 14. The side door main body 20 includes a door outer panel 22, and a door inner panel, not illustrated in the drawings, disposed at the vehicle width direction inner side of the door outer panel 22. A door mirror 18 is provided at the vehicle front side of an upper portion of the door outer panel 22.

As viewed from the vehicle width direction outer side, the window frame section 24 forms a U shape open toward the vehicle lower side. The window frame section 24 configures an upper section of the vehicle side door 14. A window opening 26 is formed in the upper section of the vehicle side door 14 by the window frame section 24. The plate shaped door glass 28 that opens and closes the window opening 26 is disposed inside the window frame section 24.

The door glass 28 is capable of being raised and lowered in the vehicle up-down direction along a vertical frame section 24R at the vehicle rear side of the window frame section 24. The window opening 26 is closed or opened by respectively raising or lowering the door glass 28 with respect to the side door main body 20. Note that in a state in which the door glass 28 has been lowered with respect to the window frame section 24, the door glass 28 is housed between the door outer panel 22 and the non-illustrated door inner panel.

Next, detailed explanation follows regarding the structure 10 configured to raise and lower vehicle glass door of the present exemplary embodiment, with the vehicle rear side serving as one vehicle front-rear direction side of the door glass 28 as an example.

Figure 2:
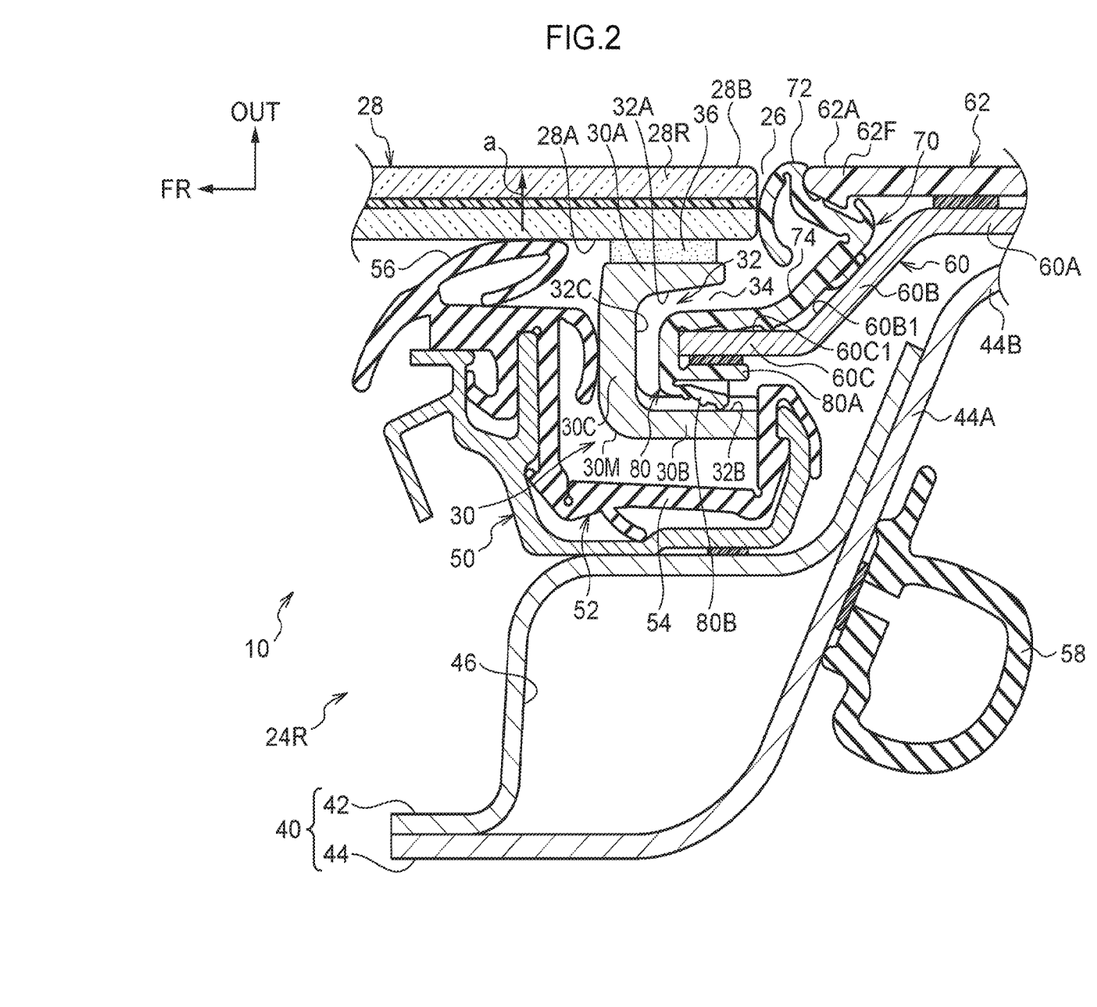
FIG. 2 is a cross-section along line 2-2 in FIG. 1.

FIG. 2 illustrates the door glass 28 in a state in which the window opening 26 has been closed. Note that, unless specifically stated otherwise, reference to the door glass 28 in the below explanation refers to the door glass 28 in the state in which the window opening 26 has been closed.

As illustrated in FIG. 2, a slider 30 is provided at an inner surface 28A at the vehicle width direction inner side of a glass end section 28R at the vehicle rear side of the door glass 28. The slider 30 is made of resin, for example. The slider 30 is formed by injection molding, for example. Note that the slider 30 may be formed of metal or the like.

The slider 30 extends in the vehicle up-down direction along the glass end section 28R. A cross-section profile of the slider 30 as viewed from the vehicle upper side forms a U shape open toward the vehicle rear side (a guide rail 60 side). A slide groove section 32 that is open at the vehicle rear side is thereby formed in the slider 30. The slide groove section 32 includes an opening 34 into which a raising-and-lowering guide tab 60C, described later, is inserted.

The slider 30 includes a pair of walls, an outside wall 30A and an inside wall 30B, that face each other in the vehicle width direction, and a bottom wall 30C that connects the wall-pair of the outside wall 30A with the inside wall 30B. The outside wall 30A forms an outer side groove wall face 32A at the vehicle width direction outer side of the slide groove section 32. An outer surface at the vehicle width direction outer side of the outside wall 30A is fixed to the inner surface 28A of the glass end section 28R by double-sided tape 36. Note that a fixing method of the slider 30 to the inner surface 28A of the glass end section 28R is not limited to the double-sided tape 36, and adhesive or welding, for example, may be employed.

Figure 3:
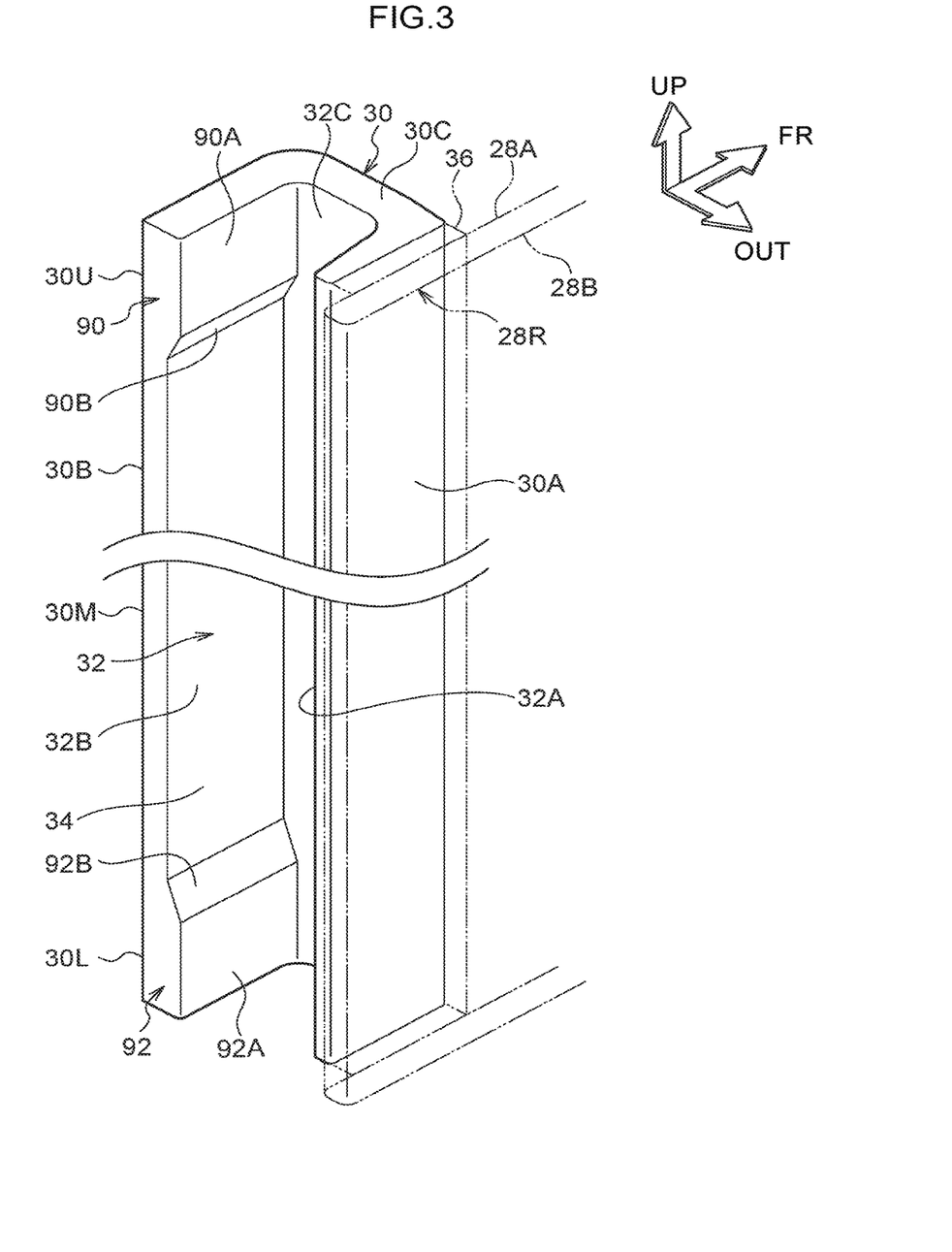
FIG. 3 is a perspective view of the slider illustrated in FIG. 2, as viewed from the vehicle width direction outer side and the vehicle rear side.

The inside wall 30B forms an inner side groove wall face 32B at the vehicle width direction inner side of the slide groove section 32. The bottom wall 30C connects end portions at the vehicle front side (another vehicle front-rear direction side) of the wall-pair of outside wall 30A and the inside wall 30B, along the vehicle width direction. The bottom wall 30C forms a bottom groove wall face 32C, forming a bottom face of the slide groove section 32. As illustrated in FIG. 3, an upper side projection section 90, described later, is provided at an upper end portion 30U in the vehicle up-down direction of the slider 30. A lower side projection section 92 is provided at a lower end portion 30L in the vehicle up-down direction of the slider 30.

As illustrated in FIG. 2, a vertical door frame 40 is disposed at the vehicle width direction inner side of the slider 30. The vertical door frame 40 is a framework member made of metal that configures a framework of the vertical frame section 24R at the vehicle rear side of the window frame section 24. The vertical door frame 40 extends along the vehicle up-down direction.

The vertical door frame 40 includes a frame outer panel 42, and a frame inner panel 44 disposed at the vehicle width direction inner side of the frame outer panel 42. The frame outer panel 42 and the frame inner panel 44 are joined together by welding or the like. A closed cross-section profile section 46 with a closed cross-section profile as viewed in cross-section profile from the vehicle upper side is formed by the frame outer panel 42 and the frame inner panel 44. The closed cross-section profile section 46 is disposed at the vehicle width direction inner side of the slider 30.

A bracket 50 is fixed by rivets or the like, not illustrated in the drawings, to an outer surface at the vehicle width direction outer side of the frame outer panel 42. The bracket 50 extends in the vehicle up-down direction along the vertical door frame 40. A cross-section profile of the bracket 50 as viewed from the vehicle upper side forms a C shape open toward the vehicle width direction outer side (the slider 30 side). The inside wall 30B of the slider 30 is inserted (disposed) inside the bracket 50. The raising and lowering of the door glass 28 is guided by the bracket 50 due to the inside wall 30B being raised and lowered in the vehicle up-down direction along the bracket 50.

A glass run 52 is attached to the bracket 50. The glass run 52 is formed using an elastic body such as rubber. The glass run 52 includes a glass run main body 54, and an outside biasing lip 56. A cross-section profile of the glass run main body 54 as viewed from the vehicle upper side forms a C shape open toward the vehicle width direction outer side (the slider 30 side). The glass run main body 54 is disposed along an inner wall face of the bracket 50. A gap between the bracket 50 and the slider 30 is closed by the glass run main body 54.

The outside biasing lip 56 extends from an end portion at the vehicle front side of the glass run main body 54 toward the vehicle width direction outer side, and also toward the vehicle rear side. The outside biasing lip 56 is press-contacted by the inner surface 28A of the door glass 28 in a state having undergone elastic deformation toward the vehicle width direction inner side. As illustrated by the arrow a, the inner surface 28A of the door glass 28 is pressed and biased toward the vehicle width direction outer side by the outside biasing lip 56. A gap between the bracket 50 and the inner surface 28A of the door glass 28 is closed by the outside biasing lip 56.

The frame inner panel 44 of the vertical door frame 40 includes an extension wall 44A that extends from a rear end portion of the closed cross-section profile section 46 toward the vehicle rear side of the slider 30. The frame inner panel 44 also includes a rail attachment portion 44B that extends from an end portion at the vehicle width direction outer side of the extension wall 44A toward the vehicle rear side. The guide rail 60 is attached to an outer surface at the vehicle width direction outer side of the rail attachment portion 44B. Note that a pillar weather strip 58 that is press-contacted by a center pillar, not illustrated in the drawings, is attached to the frame inner panel 44.

The guide rail 60 is formed using sheet metal or the like. The guide rail 60 includes a flange 60A, a sloped wall 60B, and the raising-and-lowering guide tab 60C. The flange 60A is joined to the rail attachment portion 44B by bolts or the like, not illustrated in the drawings.

The raising-and-lowering guide tab 60C is connected to the flange 60A through the sloped wall 60B. The raising-and-lowering guide tab 60C extends from an end portion at the vehicle front side of the sloped wall 60B toward the opening 34 of the slide groove section 32. The raising-and-lowering guide tab 60C is inserted into the slide groove section 32 with the opening 34 of the slide groove section 32 interposed therebetween.

Figure 4A:
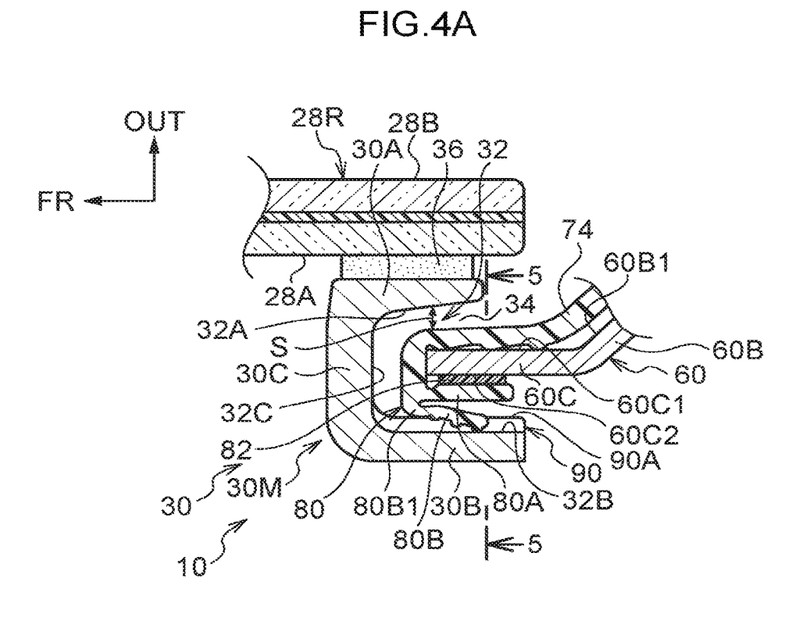
FIG. 4A is a cross-section corresponding to a cross-section along line 4A-4A in FIG. 5.
Figure 4B:
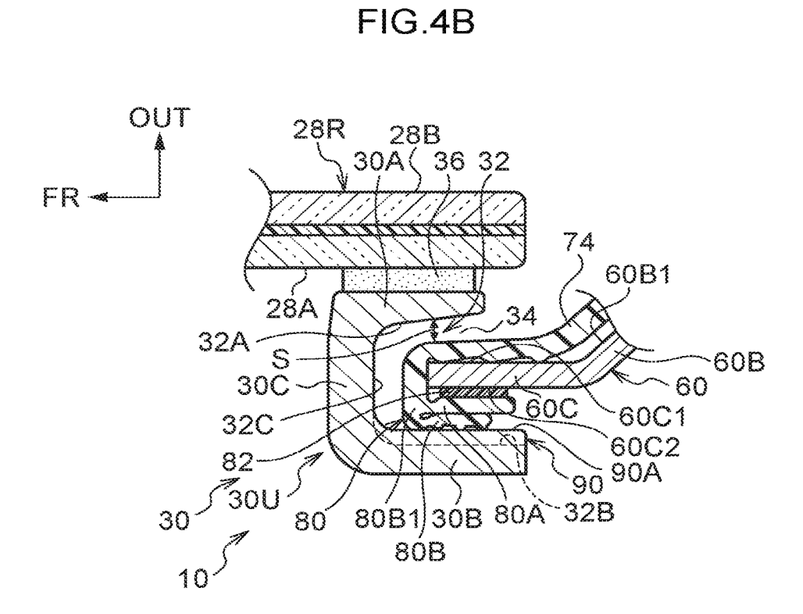
FIG. 4B is a cross-section corresponding to a cross-section along line 4B-4B in FIG. 5.

As illustrated in FIG. 4A, an outer surface 60C1 at the vehicle width direction outer side of the raising-and-lowering guide tab 60C faces the outer side groove wall face 32A of the slide groove section 32. An inner surface 60C2 at the vehicle width direction inner side of the raising-and-lowering guide tab 60C faces the inner side groove wall face 32B of the slide groove section 32.

As illustrated in FIG. 1, the raising-and-lowering guide tab 60C is provided spanning the vertical frame section 24R and the side door main body 20. The raising and lowering of the door glass 28 is guided by the raising-and-lowering guide tab 60C by raising and lowering the slider 30 in the vehicle up-down direction along the raising-and-lowering guide tab 60C. Note that the raising-and-lowering guide tab 60C at the vertical frame section 24R side and the raising-and-lowering guide tab 60C at the side door main body 20 side may be an integral unit, or may be separate bodies.

As illustrated in FIG. 2, an exterior panel 62 is joined to an outer surface at the vehicle width direction outer side of the flange 60A. The exterior panel 62 is formed in a panel shape using resin. The exterior panel 62 is an outer garnish extending along the vehicle front-rear direction and the vehicle up-down direction. The exterior panel 62 forms an outer surface (styling face) at the vehicle width direction outer side of the vehicle side door 14.

The exterior panel 62 is disposed along the vehicle front-rear direction at the vehicle rear side of the door glass 28. An end portion 62F at the door glass 28 side (vehicle front side) of the exterior panel 62 forms an opening edge at the vehicle rear side of the window opening 26. An outer surface 62A at the vehicle width direction outer side of the end portion 62F of the exterior panel 62 and the outer surface 28B at the vehicle width direction outer side of the glass end section 28R are flush with each other. This improves the styling of the vehicle side door 14.

Note that "An outer surface 62A of the end portion 62F of the exterior panel 62 and the outer surface 28B of the glass end section 28R are flush with each other" referred to herein is a concept that includes not only cases in which there is no step between the outer surface 62A and the outer surface 28B, but also cases in which there is a slight step between the outer surface 62A and the outer surface 28B, due to manufacturing error of the door glass 28 and the exterior panel 62, or the like.

A weather strip 70 is attached to the end portion 62F of the exterior panel 62. The weather strip 70 is formed using an elastic body such as rubber. The weather strip 70 is provided spanning between the end portion 62F of the exterior panel 62 and the raising-and-lowering guide tab 60C of the guide rail 60. The weather strip 70 extends in the vehicle up-down direction along the guide rail 60.

The weather strip 70 includes a door glass weather strip 72, a coupling wall 74, and a slider weather strip 80. The door glass weather strip 72 is attached to the end portion 62F of the exterior panel 62. A gap between the end portion 62F of the exterior panel 62 and the glass end section 28R of the door glass 28 is closed by the door glass weather strip 72.

The coupling wall 74 is disposed along respective outer surfaces 60B1, 60C1 at the vehicle width direction outer side of the sloped wall 60B and the raising-and-lowering guide tab 60C of the guide rail 60. The coupling wall 74 covers the respective outer surfaces 60B1, 60C1 of the sloped wall 60B and the raising-and-lowering guide tab 60C from the vehicle width direction outer side. The door glass weather strip 72 is provided at an end portion at the vehicle rear side of the coupling wall 74. Note that the coupling wall 74 is an example of a covering member.

The slider weather strip 80 is provided at an end portion at the vehicle front side of the coupling wall 74. Namely, in the present exemplary embodiment, the door glass weather strip 72 and the slider weather strip 80 are coupled together by the coupling wall 74. Note that the door glass weather strip 72 and the slider weather strip 80 may be provided as separate bodies.

As illustrated in FIG. 4A, the slider weather strip 80 is provided along the raising-and-lowering guide tab 60C. The slider weather strip 80 includes an attachment wall 80A and an inside biasing lip 80B. The attachment wall 80A extends in the vehicle front-rear direction along the inner surface 60C2 of the raising-and-lowering guide tab 60C. The attachment wall 80A is joined to the inner surface 60C2 of the raising-and-lowering guide tab 60C by double-sided tape 82. The slider weather strip 80 is thereby fixed to the raising-and-lowering guide tab 60C. Note that a joining method of the attachment wall 80A to the raising-and-lowering guide tab 60C is not limited to the double-sided tape 82, and may be by adhesive or bonding, for example.

The inside biasing lip 80B extends out in a wall shape from an end portion at the vehicle front side of the attachment wall 80A toward the vehicle width direction inner side and vehicle rear side. The inside biasing lip 80B is sloped with respect to the raising-and-lowering guide tab 60C and the attachment wall 80A. The inside biasing lip 80B is press-contacted by the inner side groove wall face 32B of the slide groove section 32 in a state in which the inside biasing lip 80B has undergone elastic deformation toward the attachment wall 80A side with a base end portion 80B1 at the attachment wall 80A side as a pivot point. A gap between the raising-and-lowering guide tab 60C and the inner side groove wall face 32B is closed by the inside biasing lip 80B.

As illustrated in FIG. 3, the inside biasing lip 80B is also press-contacted by respective facing faces 90A, 92A of the upper side projection section 90 and the lower side projection section 92, described below.

Explanation follows regarding a displacement restricting structure that restricts displacement at the vehicle width direction outer side of the door glass 28.

As illustrated in FIG. 3, the upper side projection section 90, serving as a restricting section, is provided at the upper end portion 30U of the slider 30. The lower side projection section 92, also serving as a restricting section, is provided at the lower end portion 30L of the slider 30. The upper side projection section 90 and the lower side projection section 92 project out from the inner side groove wall face 32B of the slide groove section 32 toward the vehicle width direction outer side. The upper side projection section 90 and the lower side projection section 92 face the raising-and-lowering guide tab 60C (see FIG. 2) in the vehicle width direction, further toward the vehicle width direction outer side than the inner side groove wall face 32B that is at an intermediate portion 30M in the vehicle up-down direction of the slider 30.

Figure 5:
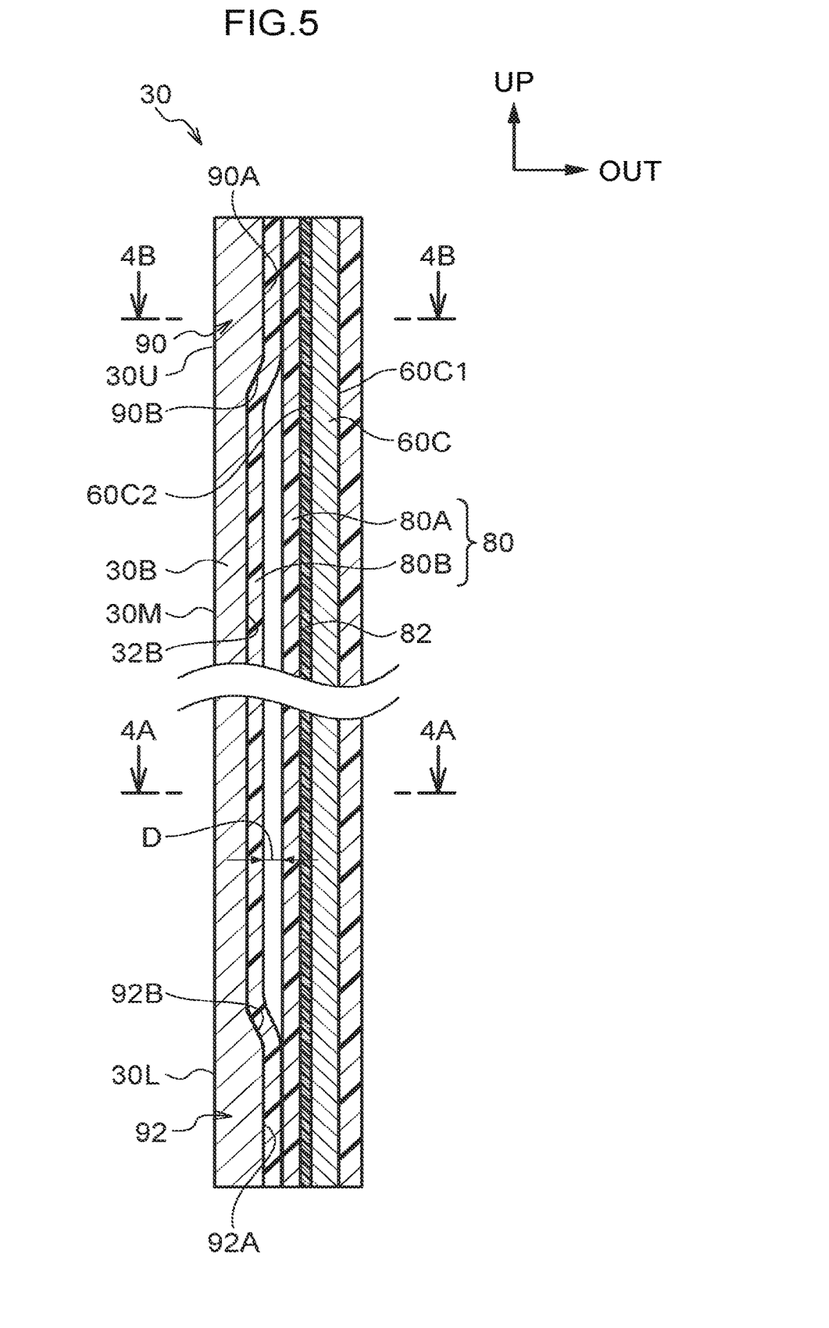
FIG. 5 is a cross-section along line 5-5 in FIG. 4A.

Specifically, as illustrated in FIG. 5, the upper side projection section 90 and the lower side projection section 92 respectively include the facing faces 90A, 92A and sloped faces 90B, 92B. The facing faces 90A, 92A are positioned further toward the vehicle width direction outer side than the inner side groove wall face 32B, and face the inner surface 60C2 of the raising-and-lowering guide tab 60C in the vehicle width direction. The inside biasing lip 80B is contacted (press-contacted) by the facing faces 90A, 92A.

As viewed from the vehicle rear side of the upper side projection section 90, the sloped face 90B of the upper side projection section 90 is sloped toward the vehicle width direction inner side on progression from the facing face 90A toward the center side (vehicle lower side) in the vehicle up-down direction of the slider 30. The facing face 90A and the inner side groove wall face 32B are connected together by the sloped face 90B.

As viewed from the vehicle rear side of the lower side projection section 92, the sloped face 92B of the lower side projection section 92 is sloped toward the vehicle width direction inner side on progression from the facing face 92A toward the center side (vehicle upper side) in the vehicle up-down direction of the slider 30. The facing face 92A and the inner side groove wall face 32B are connected together by the sloped face 92B.

Note that as previously described, the inner surface 28A of the door glass 28 is pressed and biased toward the vehicle width direction outer side by the outside biasing lip 56 (see FIG. 2). The door glass 28 and the slider 30 are displaced toward the vehicle width direction outer side with respect to the raising-and-lowering guide tab 60C due to the biasing force of the outside biasing lip 56.

Thus, the inside biasing lip 80B is pressed toward the attachment wall 80A side by the facing face 90A of the upper side projection section 90 at the upper end portion 30U of the slider 30. The inside biasing lip 80B is thereby press-contacted by the attachment wall 80A. Namely, the facing face 90A of the upper side projection section 90 is press-contacted by the inner surface 60C2 of the raising-and-lowering guide tab 60C with the inside biasing lip 80B and the attachment wall 80A interposed therebetween due to the biasing force of the outside biasing lip 56.

The inside biasing lip 80B is pressed toward the attachment wall 80A side by the facing face 92A of the lower side projection section 92 at the lower end portion 30L of the slider 30. Thus, the inside biasing lip 80B is press-contacted by the attachment wall 80A. Namely, the lower side projection section 92 is press-contacted by the inner surface 60C2 of the raising-and-lowering guide tab 60C with the inside biasing lip 80B and the attachment wall 80A interposed therebetween due to the biasing force of the outside biasing lip 56. Displacement of the slider 30 and the door glass 28 toward the vehicle width direction outer side is restricted by the upper side projection section 90 and the lower side projection section 92.

The inside biasing lip 80B is pressed toward the attachment wall 80A side by the inner side groove wall face 32B at the intermediate portion 30M of the slider 30. However, the inner side groove wall face 32B is positioned further toward the vehicle width direction inner side than the respective facing faces 90A, 92A of the upper side projection section 90 and the lower side projection section 92. Thus, the amount of elastic deformation of the inside biasing lip 80B at the intermediate portion 30M of the slider 30 is less than at the upper end portion 30U and the lower end portion 30L of the slider 30. A gap D is thereby formed between the inside biasing lip 80B and the attachment wall 80A. Thus, friction force occurring between the inner side groove wall face 32B and the inside biasing lip 80B is reduced when the slider 30 has been raised or lowered along the raising-and-lowering guide tab 60C.

As illustrated in FIG. 4A, a gap S is formed between the coupling wall 74 of the weather strip 70 and the outer side groove wall face 32A of the slide groove section 32 due to the biasing force of the outside biasing lip 56 (see FIG. 2). This suppresses the occurrence of friction force between the inner side groove wall face 32B and the inside biasing lip 80B when the slider 30 has been raised or lowered along the raising-and-lowering guide tab 60C.

Explanation follows regarding operation of the present exemplary embodiment.

In the present exemplary embodiment, as illustrated in FIG. 2, the window opening 26 is closed or opened by respectively raising or lowering the slider 30 along the raising-and-lowering guide tab 60C and the glass run 52 (bracket 50). The slider 30 is fixed to the inner surface 28A of the glass end section 28R of the door glass 28. Thus, the glass end section 28R is disposed further toward the vehicle width direction outer side than the raising-and-lowering guide tab 60C, enabling the outer surface 28B of the glass end section 28R and the outer surface 62A of the end portion 62F of the exterior panel 62 to be flush with each other. The styling of the vehicle side door 14 is improved accordingly.

Note that, if the door glass 28 is displaced toward the vehicle width direction outer side and projects out further toward the vehicle width direction outer side than the exterior panel 62 accompanying vibration of the vehicle 12, for example, there is a possibility that the appearance of the vehicle side door 14 is negatively affected.

To address this, in the present exemplary embodiment as illustrated in FIG. 5, the upper side projection section 90 is provided at the upper end portion 30U of the slider 30. The lower side projection section 92 is provided at the lower end portion 30L of the slider 30. The upper side projection section 90 and the lower side projection section 92 project out from the inner side groove wall face 32B of the slide groove section 32 toward the vehicle width direction outer side. The upper side projection section 90 and the lower side projection section 92 face the inner surface 60C2 of the raising-and-lowering guide tab 60C in the vehicle width direction further toward the vehicle width direction outer side than the inner side groove wall face 32B that is at the intermediate portion 30M of the slider 30.

Thus, when the door glass 28 and the slider 30 are displaced toward the vehicle width direction outer side, the facing faces 90A, 92A of the upper side projection section 90 and the lower side projection section 92 are press-contacted by the inner surface 60C2 of the raising-and-lowering guide tab 60C with the inside biasing lip 80B and the attachment wall 80A interposed therebetween. Thus, displacement of the slider 30 and the door glass 28 toward the vehicle width direction outer side is restricted. This suppresses the door glass 28 from projecting out further toward the vehicle width direction outer side than the exterior panel 62. The styling of the vehicle side door 14 is thereby improved.

Providing the upper side projection section 90 at the upper end portion 30U of the slider 30 and providing the lower side projection section 92 at the lower end portion 30L of the slider 30 enables displacement of the slider 30 toward the vehicle width direction outer side to be efficiently restricted.

As previously described, the upper side projection section 90 and the lower side projection section 92 face the inner surface 60C2 of the raising-and-lowering guide tab 60C in the vehicle width direction further toward the vehicle width direction outer side than the inner side groove wall face 32B that is at the intermediate portion 30M of the slider 30. Namely, the inner side groove wall face 32B at the intermediate portion 30M of the slider 30 is positioned further toward the vehicle width direction inner side than the respective facing faces 90A, 92A of the upper side projection section 90 and the lower side projection section 92. Thus, the amount of elastic deformation of the inside biasing lip 80B at the intermediate portion 30M of the slider 30 is less than at the upper end portion 30U and the lower end portion 30L of the slider 30. The gap D (see FIG. 5) is thereby formed between the inside biasing lip 80B and the attachment wall 80A.

Thus, when the slider 30 has been raised or lowered along the raising-and-lowering guide tab 60C, friction force (slide resistance) occurring between the inside biasing lip 80B and the inner side groove wall face 32B and between the attachment wall 80A and the inside biasing lip 80B at the intermediate portion 30M of the slider 30 is reduced. This suppresses or eliminates faulty raising and lowering of the door glass 28.

In this manner, the present exemplary embodiment enables faulty raising and lowering of the door glass 28 to be suppressed or eliminated, while restricting displacement of the door glass 28 toward the vehicle width direction outer side.

In the present exemplary embodiment, gaps between the raising-and-lowering guide tab 60C and the upper side projection section 90, the lower side projection section 92, and the inner side groove wall face 32B are closed by the slider weather strip 80. This enables rainwater or the like to be suppressed from entering the vehicle cabin through a gap between the slider 30 and the raising-and-lowering guide tab 60C.

In the present exemplary embodiment the inner surface 28A of the door glass 28 is pressed and biased toward the vehicle width direction outer side (the arrow a in FIG. 2) by the outside biasing lip 56. The respective facing faces 90A, 92A of the upper side projection section 90 and the lower side projection section 92 of the slider 30 are press-contacted by the inner surface 60C2 of the raising-and-lowering guide tab 60C with the slider weather strip 80 interposed therebetween due to the biasing force of the outside biasing lip 56. This reduces vibration of the slider 30 in the vehicle width direction.

The gap S (see FIG. 4A) is formed between the coupling wall 74 of the weather strip 70 and the outer side groove wall face 32A of the slide groove section 32 due to the biasing force of the outside biasing lip 56. Thus, friction force (slide resistance) is suppressed from occurring between the coupling wall 74 and the outer side groove wall face 32A when the slider 30 has been raised or lowered along the raising-and-lowering guide tab 60C. This further suppresses or eliminates faulty raising and lowering of the door glass 28.

Note that, when the slider 30 is raised or lowered along the raising-and-lowering guide tab 60C, the inside biasing lip 80B moves between the facing face 90A of the upper side projection section 90 and the inner side groove wall face 32B. If there is a step between the facing face 90A of the upper side projection section 90 and the inner side groove wall face 32B, there is possibility of the inside biasing lip 80B being damaged when this occurs. There is a similar possibility of the inside biasing lip 80B being damaged if there is a step between the facing face 92A of the lower side projection section 92 and the inner side groove wall face 32B.

To address this, in the present exemplary embodiment, the facing face 90A of the upper side projection section 90 and the inner side groove wall face 32B are connected by the sloped face 90B. Thus, the inside biasing lip 80B moves along the sloped face 90B between the facing face 90A of the upper side projection section 90 and the inner side groove wall face 32B. Damage to the inside biasing lip 80B is thereby suppressed.

Similarly, the facing face 92A of the lower side projection section 92 and the inner side groove wall face 32B are connected by the sloped face 92B. Thus, the inside biasing lip 80B moves along the sloped face 92B between the facing face 92A of the lower side projection section 92 and the inner side groove wall face 32B. Damage to the inside biasing lip 80B is thereby suppressed.

Explanation follows regarding modified examples of the above exemplary embodiment.

In the above exemplary embodiment, the outer surface 60C1 of the raising-and-lowering guide tab 60C is covered by the coupling wall 74 of the weather strip 70; however, the above exemplary embodiment is not limited to this configuration. The outer surface 60C1 of the raising-and-lowering guide tab 60C may be covered by another covering member. Alternatively, the covering member may be omitted. In such cases, a gap is formed between the outer side groove wall face 32A of the slide groove section 32 and the outer surface 60C1 of the raising-and-lowering guide tab 60C due to the biasing force of the outside biasing lip 56.

In the above exemplary embodiment, the slider weather strip 80 is provided to the raising-and-lowering guide tab 60C; however, the slider weather strip 80 may be omitted as appropriate. The outside biasing lip 56 may also be omitted as appropriate.

In the above exemplary embodiment, the structure 10 configured to raise and lower vehicle glass door is applied to the glass end section 28R at the vehicle rear side of the door glass 28; however, the above exemplary embodiment is not limited to this configuration. The structure 10 configured to raise and lower vehicle glass door according to the above exemplary embodiment may be applied to a glass end section at the vehicle front side of the door glass 28. In such cases, the vehicle front side of the door glass 28 is the one vehicle front-rear direction side of the door glass 28. The structure 10 configured to raise and lower vehicle glass door according to the above exemplary embodiment is not limited to a vehicle front side door serving as a vehicle side door, and may be applied as a vehicle rear side door.

An exemplary embodiment of the present disclosure has been explained above; however, the present disclosure is not limited to this exemplary embodiment, and the exemplary embodiment and the various modified examples may be combined and applied as appropriate. Obviously, variously modifications may be implemented within a range not departing from the spirit of the present disclosure.

What is claimed is:

1. A structure configured to raise and lower vehicle glass door, the structure comprising:
    a door glass that is provided at a vehicle side door and that closes or opens a window opening of the vehicle side door as a result of being raised or lowered;
    a raising-and-lowering guide tab that is provided at the vehicle side door, that is disposed at a vehicle width direction inner side of a glass end section at one vehicle front-rear direction side of the door glass, and that extends along a vehicle up-down direction;
    a slider that includes a slide groove section open at the one vehicle front-rear direction side and into which the raising-and-lowering guide tab is inserted, that is fixed to an inner surface at the vehicle width direction inner side of the glass end section, and that is raised and lowered along the raising-and-lowering guide tab; and
    restricting sections that are respectively provided at an upper end portion and a lower end portion in a vehicle up-down direction of the slider, that project out from an inner side groove wall face at a vehicle width direction inner side of the slide groove section toward a vehicle width direction outer side, and that face the raising-and-lowering guide tab in a vehicle width direction further toward a vehicle width direction outer side than the inner side groove wall face at an intermediate portion in the vehicle up-down direction of the slider.

2. The structure of claim 1, wherein:
    the raising-and-lowering guide tab is provided with a slider weather strip that extends in the vehicle up-down direction along the raising-and-lowering guide tab and that closes gaps between the raising-and-lowering guide tab, and the inner side groove wall face and the restricting sections.

3. The structure of claim 2, wherein, as viewed from the one vehicle front-rear direction side of the restricting sections, each of the restricting sections includes:
    a facing face that faces the raising-and-lowering guide tab in the vehicle width direction and that contacts the slider weather strip; and
    a sloped face that slopes toward the vehicle width direction inner side on progression from the facing face toward a center side in the vehicle up-down direction of the slider and that connects the facing face with the inner side groove wall face.

4. The structure of claim 2, wherein:
    the vehicle side door is provided with an outside biasing lip that presses and biases the inner surface of the door glass toward the vehicle width direction outer side, that causes the restricting sections to press-contact an inner surface at a vehicle width direction inner side of the raising-and-lowering guide tab with the slider weather strip interposed therebetween, and that forms a gap between an outer surface at a vehicle width direction outer side of the raising-and-lowering guide tab, or between a covering member that covers the outer surface and an outer side groove wall face at a vehicle width direction outer side of the slide groove section.

5. The structure of claim 2, wherein the slider weather strip includes an inside biasing lip that is press-contacted by the inner side groove wall face and the restricting sections.

6. The structure of claim 5, wherein:
    the restricting sections are respectively press-contacted by the raising-and-lowering guide tab with the inside biasing lip interposed therebetween at the upper end portion and the lower end portion of the slider; and
    a gap is formed between the inside biasing lip and the raising-and-lowering guide tab at the intermediate portion of the slider.

7. The structure of claim 5, wherein:
    the slider weather strip includes an attachment wall that is joined to an inner surface at the vehicle width direction inner side of the raising-and-lowering guide tab; and
    the inside biasing lip extends out from the attachment wall toward a vehicle width direction inner side and toward the one vehicle front-rear direction side of the door glass and is press-contacted by the inner side groove wall face.

8. The structure of claim 7, wherein:
    the restricting sections are respectively press-contacted by the attachment wall with the inside biasing lip interposed therebetween at the upper end portion and the lower end portion of the slider; and
    a gap is formed between the inside biasing lip and the attachment wall at the intermediate portion of the slider.

9. The structure of claim 1, wherein a cross-section profile of the slider as viewed from a vehicle upper side forms a U-shape open at the one vehicle front-rear direction side of the door glass.

10. The structure of claim 1, wherein the slider is formed of a resin.

11. The structure of claim 1, wherein:
    the vehicle side door includes a side door main body that configures a lower section of the vehicle side door, and a window frame section that configures an upper section of the vehicle side door and that forms the window opening; and
    the raising-and-lowering guide tab is provided spanning the window frame section and the side door main body.

* * * * *